United States Patent
Braford, Jr.

(10) Patent No.: US 6,868,949 B2
(45) Date of Patent: Mar. 22, 2005

(54) START-UP CLUTCH ASSEMBLY

(75) Inventor: Thomas E. Braford, Jr., Brighton, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 20 days.

(21) Appl. No.: 10/360,413

(22) Filed: Feb. 6, 2003

(65) Prior Publication Data

US 2004/0154893 A1 Aug. 12, 2004

(51) Int. Cl.$^7$ .......................... F16D 13/50; F16D 23/12
(52) U.S. Cl. ............................. 192/55.61; 192/70.17; 192/70.27; 192/89.22; 192/98
(58) Field of Search .............. 192/66.3, 70.28, 192/70.27, 89.22, 98, 109 A, 55.61, 89.23

(56) References Cited

U.S. PATENT DOCUMENTS

| | | | |
|---|---|---|---|
| 1,233,561 A | 7/1917 | Dornfeld | |
| 2,174,395 A | 9/1939 | Aikman | 188/153 |
| 2,639,013 A | * 5/1953 | Meschia | 192/70.22 |
| 3,171,522 A | 3/1965 | Petrie et al. | 192/69 |
| 3,534,842 A | 10/1970 | Davison, Jr. | 192/113 |
| 3,537,556 A | 11/1970 | Pfeffer | 192/70.28 |
| 3,612,237 A | 10/1971 | Honda | 192/85 |
| 3,654,692 A | 4/1972 | Goetz | 29/558 |
| 3,834,503 A | 9/1974 | Maurer et al. | 192/113 |
| 4,081,065 A | 3/1978 | Smyth et al. | |
| 4,205,739 A | 6/1980 | Shelby et al. | 192/113 |
| 4,219,246 A | 8/1980 | Ladin | 308/219 |
| 4,270,647 A | 6/1981 | Leber | 192/113 |
| 4,301,904 A | 11/1981 | Ahlen | 192/70.12 |
| 4,361,060 A | 11/1982 | Smyth | |
| 4,372,434 A | 2/1983 | Aschauer | 192/85 |
| 4,501,676 A | 2/1985 | Moorhouse | 252/12 |
| 4,548,306 A | 10/1985 | Hartz | 192/70.28 |

(List continued on next page.)

FOREIGN PATENT DOCUMENTS

| | | |
|---|---|---|
| DE | 871 857 | 7/1949 |
| DE | 31 18 565 A1 | 11/1982 |

(List continued on next page.)

*Primary Examiner*—Rodney H. Bonck
(74) *Attorney, Agent, or Firm*—Bliss McGlynn, P.C.; Greg Dziegielewski

(57) ABSTRACT

A start-up clutch assembly (10) for translating torque between a prime mover and a transmission includes a drive member (16) and a clutch pack (30) is supported between the drive (16) and driven members (24). The clutch pack (30) is operable to move between a closed pack mode and an open pack mode to connect and disconnect the drive and driven members (16, 24) to selectively transfer and interrupt torque translation therebetween. A torque apply piston assembly (54) is operable to move between a disengaged position to connect and disconnect the drive and driven members and to provide a constant biasing force so that the clutch pack (30) normally operates in the closed pack mode to translate torque between the drive and driven members (16, 24). A torque interrupt actuator assembly (68) is connected to the torque apply piston assembly (54) and is operable to selectively move the torque apply piston assembly from its engaged position to the disengaged position to thereby interrupt torque translation between the drive and driven members through the clutch pack. A return piston assembly (84) is operable to provide a constant biasing force in a direction opposite to the constant biasing force generated by the torque apply piston assembly (54) to move the clutch pack (30) from the closed pack mode to the open pack mode when the torque interrupt actuator assembly (68) moves the torque apply piston assembly (54) from its engaged position to its disengaged position.

16 Claims, 2 Drawing Sheets

U.S. PATENT DOCUMENTS

| | | | |
|---|---|---|---|
| 4,646,891 A | 3/1987 | Braun | |
| 4,667,534 A | 5/1987 | Kataoka | 74/711 |
| 4,667,798 A | 5/1987 | Sailer et al. | 192/70.12 |
| 4,700,823 A | 10/1987 | Winckler | 192/107 |
| 4,802,564 A | 2/1989 | Stodt | 192/70.28 |
| 4,808,015 A | 2/1989 | Babcock | 384/609 |
| 4,827,784 A | 5/1989 | Muller et al. | 74/330 |
| 5,174,420 A | 12/1992 | DeWald et al. | 188/264 |
| 5,275,267 A | 1/1994 | Slicker | |
| 5,284,232 A * | 2/1994 | Prud'Homme | 192/70.21 |
| 5,305,863 A | 4/1994 | Gooch et al. | 192/70.12 |
| 5,383,544 A * | 1/1995 | Patel | 192/70.28 |
| 5,450,934 A | 9/1995 | Maucher | |
| 5,469,943 A | 11/1995 | Hill et al. | 188/264 |
| 5,495,927 A | 3/1996 | Samie et al. | 192/70.12 |
| 5,499,704 A * | 3/1996 | Hays | 192/89.23 |
| 5,505,286 A * | 4/1996 | Nash | 192/70.27 |
| 5,538,121 A | 7/1996 | Hering | 192/70.12 |
| 5,577,588 A | 11/1996 | Raszkowski | 192/113.35 |
| 5,613,588 A | 3/1997 | Vu | 192/113.35 |
| 5,634,541 A | 6/1997 | Maucher | |
| 5,755,314 A | 5/1998 | Kanda et al. | 192/70.12 |
| 5,899,310 A | 5/1999 | Mizuta | 192/107 |
| 5,908,100 A | 6/1999 | Szadkowski et al. | |
| 5,918,715 A | 7/1999 | Ruth et al. | 192/46 |
| 6,000,510 A | 12/1999 | Kirkwood et al. | |
| 6,026,944 A | 2/2000 | Satou et al. | 192/70.28 |
| 6,071,211 A | 6/2000 | Liu et al. | |
| 6,116,397 A * | 9/2000 | Kosumi et al. | 192/89.23 |
| 6,189,669 B1 | 2/2001 | Kremer et al. | 192/70.12 |
| 6,217,479 B1 | 4/2001 | Brown et al. | |
| 6,244,407 B1 | 6/2001 | Kremer et al. | 192/70.12 |
| 6,299,565 B1 | 10/2001 | Jain et al. | |
| 6,419,062 B1 * | 7/2002 | Crowe | 192/89.23 |
| 2002/0014386 A1 * | 2/2002 | Diemer et al. | 192/70.14 |

FOREIGN PATENT DOCUMENTS

| | | |
|---|---|---|
| DE | 3149 880 C2 | 4/1985 |
| DE | 35 32 759 C1 | 3/1987 |
| EP | 0 762 009 A1 | 3/1997 |
| EP | 0 848 179 A1 | 6/1998 |
| FR | 71.03411 | 9/1972 |
| JP | 4-366032 | 12/1992 |
| WO | WO 97/32678 | 9/1997 |
| WO | WO 99/45289 | 9/1999 |

\* cited by examiner

START-UP CLUTCH ASSEMBLY

BACKGROUND OF THE INVENTION

1. Field of the Invention

The present invention relates, generally, to a clutch assembly, and more specifically, to a start-up clutch assembly for translating torque between a prime mover and a transmission.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive power demand of the vehicle. Hydrokinetic devices, such as torque converters, are often employed between the internal combustion engine and its associated automatic transmission for transferring kinetic energy therebetween.

Torque converters typically include impeller assemblies that are operatively connected for rotation with the torque input from an internal combustion engine, a turbine assembly that is fluidly connected in driven relationship with the impeller assembly, and a stator or reactor assembly. These assemblies together form a substantially toroidal flow passage for kinetic fluid that circulates in the torque converter. Each assembly includes a plurality of blades or veins that act to convert mechanical energy to hydrokinetic energy and back to mechanical energy. The stator assembly of a conventional torque converter is locked against rotation in one direction but is free to spin about an axis in the direction of rotation of the impeller assembly and the turbine assembly. When the stator assembly is locked against rotation, the torque is multiplied by the torque converter. During torque multiplication, the output torque is greater than the input torque for the torque converter. However, when the stator assembly freewheels in the direction of rotation of the impeller and turbine assemblies, there is no torque multiplication and the torque converter becomes a fluid coupling. Fluid couplings have inherent slip. In the absence of a fully engaged lock-up clutch, torque converter slip exists when the speed ratio is less than 1.0 (RPM input>RPM output of the torque converter). This inherent slip reduces the efficiency of the torque converter.

While torque converters provide a smooth coupling between the engine and the transmission, the slippage of the torque converter results in parasitic losses that decrease the efficiency of the entire power train. More specifically, the operating efficiency of the converter during start-up is relatively low. It varies from a zero value at stall to a maximum value of approximately 80–85% at the coupling point. The coupling point occurs at the transition from the torque multiplication mode to the coupling mode when the torque multiplication ratio is unity.

In addition to the problems with efficiency, torque converters of the type known in the related art occupy substantial space in the driveline assembly between the transmission gearing and the engine. Torque converters typically define relatively large diameters when compared to the transmission gearing. Further, the torque converter has a substantial rotating mass that must be accelerated by the engine during start-up of the vehicle during forward drive or in reverse drive. The effective mass of the converter necessarily includes the mass of the hydraulic fluid that circulates in the torus circuit defined by the converter impeller, the turbine, and the stator assembly.

On the other hand, frictional clutches have been also employed in the related art to selectively connect a source of rotational power, such as the crank shaft of an internal combustion engine and its flywheel, to a driven mechanism, such as a transmission. The frictional clutches of the type that have been employed in the related art overcome the disadvantages associated with reduced efficiencies, parasitic losses, relatively large effective mass and the space that is occupied by torque converters used for the same purpose. In an automotive context, clutches used for this purpose are often referred to as "start-up" clutches. Clutches of this type typically include a clutch pack that is operatively supported between a drive and driven member of the clutch assembly. The drive member is operatively connected to the torque input from the prime mover. The driven member is operatively connected to the input shaft of the transmission. A piston assembly is supported for axial movement in response to hydraulic pressure to engage the clutch pack to translate torque between the drive and driven members. However, when the engine is connected with the transmission through friction clutches of the type known in the related art, vibrations are often transmitted through the clutch and into the transmission as well as other drivetrain components, producing undesirable noise conditions such as gear rattle. In addition, over time, torque spikes that can reach relatively high magnitudes at drivetrain resonance frequencies can damage the transmission as well as other drivetrain components.

As an alternative to the use of a hydraulically actuated piston, it is known in the related art to employ a spring biased piston assembly that biases the piston into engagement with the clutch pack such that the start-up clutch assembly normally operates in "closed pack" mode. A return mechanism is employed to disengage the piston assembly when torque translation through the drive and driven members is to be interrupted. While start-up clutches of this type have generally worked for their intended purposes, it has been found that pistons that are spring biased to engage the clutch pack typically require 8–12 mm. of travel in order to disengage the piston so that the clutch operates in "open pack" mode. Unfortunately, it can be difficult to design an appropriate spring-based biasing member that provides adequate load during "closed pack" operation of the clutch pack while, at the same time, allowing for open pack operation to interrupt torque translation in a relatively short amount of piston travel.

Accordingly, there is a need in the art for an improved start-up clutch assembly that effectively translates torque between the prime mover and the transmission in a cost-effective manner and that can be controlled so as to reduce or eliminate undesirable vibrations and torque spikes between the prime mover and the transmission. In addition, there remains a need in the art for an improved start-up clutch assembly that operates in a normally closed pack mode, provides adequate apply force through the piston, and that can be quickly shifted to "open pack" mode to interrupt torque translation between the drive and driven members with minimal movement of the apply piston.

SUMMARY OF THE INVENTION

The present invention overcomes the disadvantages in the related art in a start-up clutch assembly for translating torque between a prime mover and a transmission. The start-up clutch assembly of the present invention includes a drive member, a driven member with the drive and driven members rotatable about a common axis and defining a housing therebetween. A clutch pack is supported in the clutch housing and is interposed between the drive and driven members. The clutch pack is operable to move between a closed pack mode wherein torque is translated across the clutch pack and an open pack mode wherein torque is interrupted across the clutch pack to connect and disconnect the drive and driven members to selectively transfer and interrupt torque translation therebetween. A torque apply piston assembly is also supported in the clutch housing. The torque apply piston assembly is operable to move between a disengaged position wherein the clutch pack operates in open pack mode and an engaged position wherein the torque apply piston assembly moves the clutch pack to the closed pack mode to connect and disconnect the drive and driven members. Moreover, the torque apply piston assembly is operable to provide a constant biasing force so that the clutch pack normally operates in the closed pack mode to translate torque between the drive and driven members. In addition, the start-up clutch assembly of the present invention includes a torque interrupt actuator assembly that is operatively connected to the torque apply piston assembly. The torque interrupt actuator assembly is operable to selectively move the torque apply piston assembly from its engaged position to the disengaged position to thereby interrupt torque translation between the drive and driven members through the clutch pack. Finally, a return piston assembly is supported by the clutch housing and is connected to the clutch pack. The return piston assembly is operable to provide a constant biasing force in a direction opposite to the constant biasing force generated by the torque apply piston assembly to move the clutch pack from the closed pack mode to the open pack mode when the torque interrupt actuator assembly moves the torque apply piston assembly from its engaged position to its disengaged position.

The start-up clutch assembly of the present invention normally operates in "closed pack" mode to effectively translate torque between the prime mover and the transmission in a cost-effective manner. Moreover, the clutch assembly of the present invention can be controlled so as to reduce or eliminate undesirable vibrations and torque spikes between the prime mover and the transmission. Finally, torque may be interrupted between the drive and driven members through the clutch pack in the start-up clutch assembly of the present invention using a much shorter piston travel such that the clutch pack quickly and effectively moves from "closed pack" to "open pack" operation.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
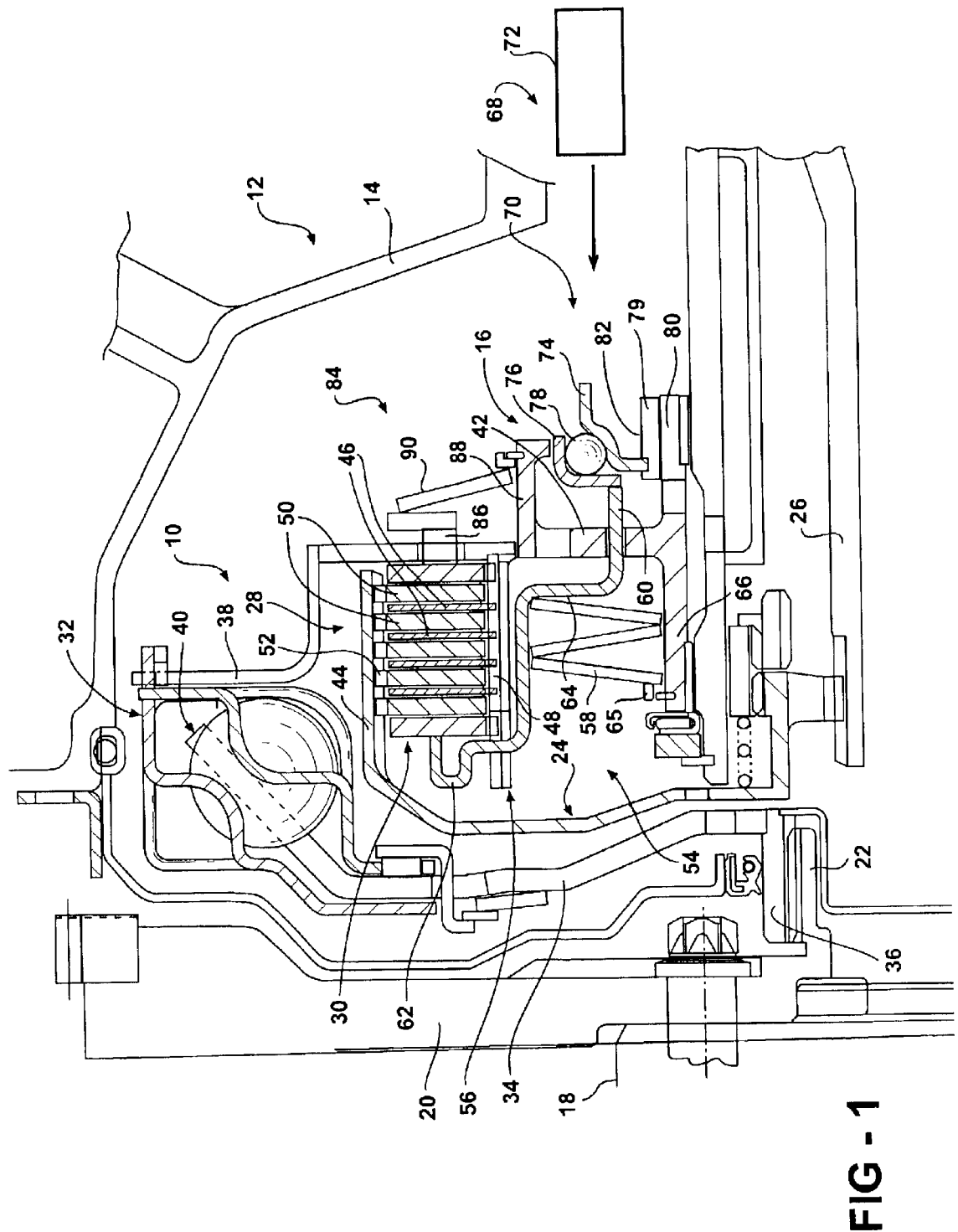
FIG. 1 is a cross-sectional side view of the start-up clutch assembly of the present invention illustrating the clutch pack operating in its normally closed pack mode.

Referring now to the figures, where like numerals are used to designate like structure, a start-up clutch assembly of the present invention is generally indicated at 10. In the representative example disclosed herein, the start-up clutch assembly 10 is employed to translate torque from a prime mover, such as an internal combustion engine, to the input shaft of a transmission. The transmission is representatively indicated at 12. The transmission 12 may then subsequently distribute this power to components, such as a drive shaft and an axle having a differential (not shown) to power the wheels of an automotive vehicle. While the start-up clutch assembly 10 illustrated in these figures is particularly adapted for use with an automotive vehicle, those having ordinary skill in the art will understand that the clutch assembly may be employed in connection with other types of transmissions.

To this end, the clutch assembly 10 of the present invention is supported in the front end of the transmission housing 14 and adjacent to the power take-off of the prime mover. The clutch assembly 10 includes a drive member, generally indicated at 16, that is operatively connected to the output of the prime mover. As depicted in these figures, the drive member 16 is operatively connected to the crankshaft 18 of an internal combustion engine through the flywheel 20 and a power take-off shaft 22. On the other hand, a driven member, generally indicated at 24, is operatively connected to the input shaft 26 of the transmission 12. The drive and driven members 16, 24 are rotatable about a common axis and define a clutch housing 28 therebetween.

Figure 2:
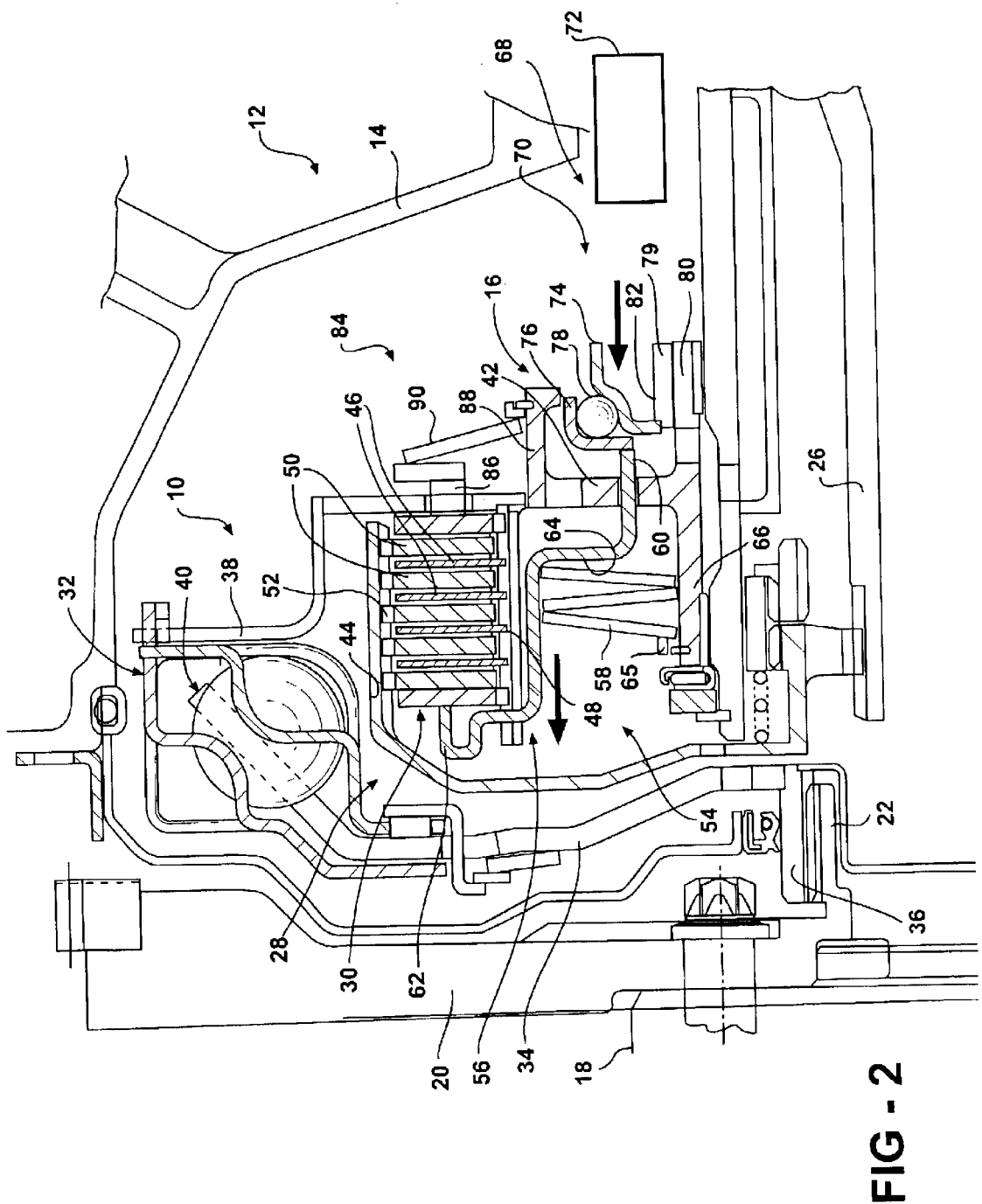
FIG. 2 is a cross-sectional side view of the start-up clutch assembly of the present invention illustrating the clutch pack operating in its open pack mode.

One half of an annular clutch pack is generally indicated at 30 in FIGS. 1 and 2. The clutch pack 30 is supported in the clutch housing 28 interposed between the drive and driven members 16, 24. The clutch pack 30 is operable to move between a closed pack mode wherein torque is translated across the clutch pack 30 and an open pack mode wherein torque is interrupted across the clutch pack 30. In this way, the clutch pack 30 acts to connect and disconnect the drive and driven members 16, 24 to selectively transfer and interrupt torque translation therebetween. The drive member 16 includes a torsional damper assembly, generally indicated at 32, that is interposed between the clutch pack 30 and the output of the prime mover. The torsional damper assembly 32 acts to damp torsional forces translated from the prime mover to the driven member 24. Thus, the torsional damper assembly 32 may be of any conventional type commonly known in the art for dampening these vibrations. For example, the torsional damper assembly 32 may include a damper input member 34 that includes an annular hub 36 that is splined to the power take off shaft 22 of the internal combustion engine. A damper output member 38 is operatively connected to the drive member 16 of the clutch assembly 10. A damper, generally indicated at 40, is interposed between the damper input 34 and output 38 and may include a plurality of coiled springs annularly disposed about the rotational axis of the clutch assembly 10. The coiled springs act to damp vibrations and torsional spikes that may otherwise be translated from the internal combustion engine to the transmission 12 as is commonly known in the art.

The drive member 16 has a drive hub 42. Similarly, the driven member 24 has a driven hub 44. The clutch pack 30 includes a plurality of annular plates 46 that are splined to an annular dam 48 of the drive hub 42. In addition, the clutch pack 30 includes a plurality of annular friction discs 50 that are splined at 52 to the driven hub 44. The friction discs 50 are interleaved between the plates 46. The annular plates 46 and discs 50 rotate relative to one another in substantial non-contacting relationship when the clutch pack 30 is in the open pack mode. On the other hand, the annular plates 46 and discs 50 rotate substantially together when the clutch pack is in the closed pack mode. Thus, the plates and friction discs are axially moveable relative to their respective splined hubs 42, 44 to come into frictional engagement so as to reduce or eliminate relative rotation between the plates 46 and discs 50. Similarly, the plates and friction discs are axially moveable relative to their respective splined hubs to move out of frictional engagement relative to one another.

The clutch assembly 10 further includes a torque apply piston assembly, generally indicated at 54. The torque apply piston assembly 54 is supported in the clutch housing 28 and is operable to move between a disengaged position (FIG. 2) wherein the clutch pack 30 operates in open pack mode and the interleaved friction discs 50 and plates 46 rotate substantially past one another and an engaged position (FIG. 1) wherein the piston assembly 54 moves the clutch pack 30 to the closed pack mode to connect and disconnect the drive and driven members 16, 24, respectively. In the embodiment illustrated in these figures, the torque apply piston assembly 54 is operable to provide a constant biasing force so that the clutch pack 30 normally operates in the closed pack mode as shown in FIG. 1 to translate torque between the drive and driven members 16, 24 as will be explained in greater detail below. In addition, while the start-up clutch assembly 10 of the present invention may operate as a "dry clutch," in the embodiment illustrated in FIGS. 1 and 2, the start-up clutch assembly 10 of the present invention is preferably a "wet" clutch in that the clutch pack 30 may be bathed in a flow of cooling fluid to maintain clutch temperatures within predetermined designed parameters.

The torque apply piston assembly 54 includes a piston, generally indicated at 56, that is moveably supported between its engaged and disengaged positions. In addition, a torque piston biasing member 58 acts to constantly bias the torque apply piston 56 to its engaged position. The torque apply piston 56 is rotatably supported by the drive member 16 about the common axis of rotation of the drive and driven members 16, 24, respectively. The torque apply piston 56 includes an annular flange 60 that extends in the direction of the common axis of rotation. A piston head 62 is formed opposite the annular flange 60 and is operable to engage the clutch pack 30. In addition, the piston 56 includes an annular seat 64 that is formed between the piston head 62 and the axially extending flange 60. The torque piston biasing member 58 acts between a retaining ring 65 fixed to an annular flange 66 of the drive member 16 and the seat 64 to bias the piston head 62 toward the clutch pack 30 and into its engaged position. In the preferred embodiment illustrated in these figures, the torque piston biasing member 58 is a Bellville spring supported within the clutch housing 28 between the annular dam 48 and an annular flange 66 formed on the drive member 16 spaced from the dam 48.

The start-up clutch assembly 10 of the present invention also includes a torque interrupt actuator assembly that is generally indicated at 68. The torque interrupt actuator assembly 68 is operatively connected to the torque apply piston assembly 54 and is operable to selectively move the torque apply piston assembly 54 from its engaged position (FIG. 1) to its disengaged position (FIG. 2) thereby interrupting torque translation between the drive and driven members 16, 24 through the clutch pack 30. To this end, the torque interrupt actuator assembly 68 includes a throw-out bearing, generally indicated at 70, that is operatively supported for rectilinear movement on the drive member 16. An actuator, schematically illustrated at 72, selectively moves the throw-out bearing 70 in a direction opposite to the constant biasing force generated by the torque apply piston assembly 54. The throw-out bearing 70 includes an inner ring 74, and outer ring 76, and a plurality of ball bearings 78 supported between the inner and outer rings 74, 76, respectively. The outer ring 76 is operatively connected to the torque apply piston assembly 54 via the axially extending annular flange 60 of the piston 56. The inner ring 74 is operatively supported by the drive member 16. A sleeve 79 supported on stub hub 80 defined on the drive member 16 presents a plurality of splines as indicated at 82. The splines 82 extend in the direction of the common axis of rotation. The inner ring 74 of the throw out bearing 70 is supported on the sleeve 79 for rectilinear axial movement in the direction of the splines 82.

In addition, the start-up clutch assembly 10 also includes a return piston assembly, generally indicated at 84, that is supported by the clutch housing 28 and operatively connected to the clutch pack 30. The return piston assembly 84 is operable to provide a constant biasing force in a direction opposite to the constant biasing force generated by the torque apply piston assembly 54 to move the clutch pack 30 from its closed pack mode to its open pack mode when the torque interrupt actuator assembly 68 moves the torque apply piston assembly 54 from its engaged position to its disengaged position. To this end, the piston return assembly 84 includes a piston 86. The piston 86 is operatively connected to the clutch pack 30. A return biasing member 90 that is supported on an annular ledge 88 of the drive member 16 provides a biasing force on the return piston in a direction opposite to the biasing force generated by the torque apply piston assembly 54 to move the clutch pack 30 to its open pack mode. Similarly then, those having ordinary skill in the art will appreciate that the torque piston biasing member 58 generates a biasing force in a direction opposite to the force generated by the return piston assembly 84. In the preferred embodiment illustrated in these figures, the return biasing member 90 is a Bellville spring.

In operation, the start-up clutch assembly 10 of the present invention normally operates in a closed pack or engaged mode so as to translate torque between the internal combustion engine and the transmission. To this end, the torque apply piston 56 is normally biased to its engaged position by the Bellville spring 58 as shown in FIG. 1. The pressure supplied by the torque apply piston 56 compresses the clutch pack 30, and moves the annular friction discs 50 and plates 46 along their respective splined hubs 44, 42 into engagement with one another thereby eliminating or substantially eliminating any relative rotation therebetween according to the desired operational parameters. When torque translated across the clutch pack 30 is to be reduced or eliminated, the actuator 72 acts on the inner ring 74 of the throw out bearing 70 such that it moves along the splined sleeve 79 in a direction opposite to the force generated by the Bellville spring 58 acting on the torque apply piston 56. The outer ring 76 engages the annular flange 60 of the torque apply piston 56 to move it to the left as viewed in FIG. 2. Movement of the torque apply piston 56 to the left moves the piston head 62 out of engagement or substantially out of engagement with the clutch pack 30. In addition to the movement of the torque apply piston 56 to its disengaged position and in order to ensure that the clutch pack 30 moves quickly and efficiently to its open pack mode in the shortest amount of torque apply piston travel, the return piston assembly 84 further acts on the clutch pack 30 to separate the friction discs 50 and the plates 46.

In this way, the start-up clutch assembly 10 of the present invention can be controlled to reduce or eliminate undesirable vibrations and torque spikes between the prime mover and the transmission. Furthermore, torque may be interrupted between the drive and driven members 16, 24, respectively, through the clutch pack 30 using a much shorter piston travel such that the clutch pack can quickly and effectively move from "closed pack" mode to its "open pack" mode using 2.5 to 3.5 mm. of piston travel.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

I claim:

1. A start-up clutch assembly (10) for translating torque between a prime mover and a transmission, said clutch assembly comprising:

a drive member (16), a driven member (24), said drive and driven members (16, 24) rotatable about a common axis and defining a housing (28) therebetween;

a clutch pack (30) supported in said clutch housing (28), interposed between said drive and driven members (16, 24) and operable to move between a closed pack mode wherein torque is translated across said clutch pack (30) and an open pack mode wherein torque is interrupted across said clutch pack (30) to connect and disconnect said drive and driven members (16, 24) to selectively transfer and interrupt torque translation therebetween;

a torque apply piston assembly (54) supported in said clutch housing (28), said torque apply piston assembly (54) including a piston (56) that is rotatably supported by said drive member (16) about said common axis of rotation and includes an annular flange (60) extending in the direction of said common axis of rotation, a piston head (62) operable to engage said annular clutch pack (30) and an annular seat (64) formed between said piston head (62) and said axially extending flange (60) and a torque piston biasing member (58) that acts on said seat (64) to bias said piston head (62) toward said clutch pack (30), said torque apply piston assembly (54) operable to move between a disengaged position wherein said clutch pack (30) operates in open pack mode and an engaged position wherein said torque apply piston assembly (54) moves said clutch pack (30) to said closed pack mode to connect and disconnect said drive and driven members (16, 24), said torque apply piston assembly (54) operable to provide a constant biasing force so that said clutch pack (30) normally operates in said closed pack mode to translate torque between said drive and driven members (16, 24);

a torque interrupt actuator assembly (68) operatively connected to said torque apply piston assembly (54), said torque interrupt actuator assembly (68) operable to selectively move said torque apply piston assembly (54) from said engaged position to said disengaged position thereby interrupting torque translation between said drive and driven members (16, 24) through said clutch pack (30); and a return piston assembly (84) supported by said clutch housing (28) and connected to said clutch pack (30), said return piston assembly (84) operable to provide a constant biasing force in a direction opposite to the constant biasing force generated by said torque apply piston assembly (54) to move said clutch pack (30) from said closed pack mode to said open pack mode when said torque interrupt actuator assembly (68) moves said torque apply piston assembly (54) from said engaged position to said disengaged position.

2. A start-up clutch assembly (10) as set forth in claim 1 wherein said torque piston biasing member (58) is a Bellville spring supported within said clutch housing (28) and that generates a biasing force in a direction opposite to said force generated by said return piston assembly (84).

3. A start-up clutch assembly (10) as set forth in claim 1 wherein said torque interrupt actuator assembly (68) includes a throw-out bearing (70) operatively supported for rectilinear movement on said drive member (16) and an actuator (72) that selectively moves said throw-out bearing (70) in a direction opposite to the constant biasing force generated by said torque apply piston assembly (54).

4. A start-up clutch assembly (10) as set forth in claim 3 wherein said throw-out bearing (70) includes an inner ring (74), an outer ring (76), and a plurality of ball bearings (78) supported between said inner and outer ring (74, 76), said outer ring (76) operatively connected to said torque apply piston assembly (54), said inner ring (74) operatively supported by said drive member (16).

5. A start-up clutch assembly (10) as set forth in claim 4 further including a sleeve (79) supported on said drive member (16), said sleeve (79) presenting a plurality of splines (82) extending in the direction of said common axis of rotation, said inner ring (74) supported on said sleeve (79) for rectilinear axial movement in the direction of said splines (82).

6. A start-up clutch assembly (10) as set forth in claim 5 wherein said return biasing member (90) is a Bellville spring.

7. A start-up clutch assembly (10) as set forth in claim 1 wherein said piston return assembly (84) includes a piston (86) supported by said drive member (16) and operatively connected to said clutch pack (30) and a return biasing member (90) that provides a biasing force on said return piston (86) in a direction opposite to the biasing force generated by said torque apply piston assembly (54) to move said clutch pack (30) to said open pack mode.

8. A start-up clutch assembly (10) as set forth in claim 1 wherein said drive member (16) includes a torsional damper assembly (32) interposed between said clutch pack (30) and the output of the prime mover for damping torsional forces translated from the prime mover to said driven member (24).

9. A start-up clutch assembly (10) as set forth in claim 1 wherein said drive member (16) has a drive hub (42), said driven member (24) has a driven hub (44), said clutch pack (30) including a plurality of annular plates (46) splined to said drive hub (42) and a plurality of annular friction discs (50) splined to said driven hub (44) and interleaved between said annular plates (46), said annular plates (46) and discs (50) rotating relative to one another in substantial non-contacting relationship when said clutch pack (30) is in the open pack mode and rotating substantially together when said clutch pack (30) is in the closed pack mode.

10. A start-up clutch assembly (10) for translating torque between a prime mover and a transmission having an input shaft, said clutch assembly comprising:

a drive member (16) operatively connected to the output of the prime mover;

a driven member (24) operatively connected to the input shaft of the transmission, said drive and driven members (16, 24) rotatable about a common axis and defining a clutch housing (28) therebetween;

a clutch pack (30) supported in said clutch housing (28), interposed between said drive and driven members (16, 24) and operable to move between a closed pack mode wherein torque is translated across said clutch pack (30) and an open pack mode wherein torque is interrupted across said clutch pack (30) to connect and disconnect said drive and driven members (16, 24) to selectively transfer and interrupt torque translation therebetween;

a torque apply piston assembly (54) supported in said clutch housing (28), said torque apply piston assembly (54) including a piston (56) that is rotatably supported by said drive member (16) about said common axis of rotation and includes an annular flange (60) extending in the direction of said common axis of rotation, a piston head (62) operable to engage said annular clutch pack (30) and an annular seat (64) formed between said piston head (62) and said axially extending flange (60) and a torque piston biasing member (58) that acts on said seat (64) to bias said piston head (62) toward said clutch pack (30), said torque apply piston (56) operable to move between a disengaged position wherein said clutch pack (30) operates in open pack mode and an engaged position wherein said torque apply piston (56) moves said clutch pack (30) to said closed pack mode to connect and disconnect said drive and driven members (16, 24), said torque apply piston assembly (54) operable to provide a constant biasing force so that said clutch pack (30) normally operates in said closed pack mode to translate torque between said drive and driven members (16, 24);

a torque interrupt actuator assembly (68) operatively connected to said annular flange (60) on said torque apply piston (56), said torque interrupt actuator assembly (68) including a throw-out bearing (70) operatively supported for rectilinear movement on said drive member (16) and an actuator (72) that selectively moves said throw-out bearing (70) in a direction opposite to the constant biasing force generate by said torque apply piston assembly (54), said torque interrupt actuator assembly (68) operable to selectively move said torque apply piston assembly (54) from said engaged position to said disengaged position thereby interrupting torque translation between said drive and driven members (16, 24) through said clutch pack (30); and a return piston assembly (84) supported by said clutch housing (28) and connected to said clutch pack (30), said piston return assembly (84) including a piston (86) supported by said drive member (16) and operatively connected to said clutch pack (30) and a return biasing member (90) that provides a constant biasing force in a direction opposite to the constant biasing force generated by said torque apply piston assembly (54) to move said clutch pack (30) from said closed pack mode to said open pack mode when said torque interrupt actuator assembly (68) moves said torque apply piston assembly (54) from said engaged position to said disengaged position.

11. A start-up clutch assembly (10) as set forth in claim 10 wherein said throw-out bearing (70) includes an inner ring (74), an outer ring (76), and a plurality of ball bearings (78) supported between said inner and outer rings (74, 76), said outer ring (76) operatively connected to said torque apply piston assembly (54), said inner ring (74) operatively supported by said drive member (16).

12. A start-up clutch assembly (10) as set forth in claim 11 further including a sleeve (79) supported on said drive member (16), said sleeve (79), presenting a plurality of splines (82) extending in the direction of said common axis of rotation, said inner ring (74) supported on said sleeve (79) for rectilinear axial movement in the direction of said splines (82).

13. A start-up clutch assembly (10) as set forth in claim 10 wherein said drive member (16) includes a torsional damper assembly (32) interposed between said clutch pack (30) and the output of the prime mover for damping torsional forces translated from the prime mover to said driven member (16).

14. A start-up clutch assembly (10) as set forth in claim 10 wherein said drive member (16) has a drive hub (42), said driven member (24) has a driven hub (44), said clutch pack (30) including a plurality of annular plates (46) splined to said drive hub (42) and a plurality of annular friction discs (50) splined to said driven hub (44) and interleaved between said annular plates (46), said annular plates (46) and discs (50) rotating relative to one another in substantial non-contacting relationship when said clutch pack (30) is in the open pack mode and rotating substantially together when said clutch pack (30) is in the closed pack mode.

15. A automotive transmission (12) comprising:

a transmission housing (14), a transmission input shaft (26), and a start-up clutch assembly (10) operatively supported in said transmission housing (14) for translating torque between a prime mover and the input shaft (26) of the transmission (19), said start-up clutch assembly (10) including:

a drive member (16) operatively connected to the output of the prime mover;

a driven member (24) operatively connected to the input shaft (26) of the transmission (12), said drive and driven members (16,24) rotatable about a common axis and defining a clutch housing (28) therebetween;

a clutch pack (30) supported in said clutch housing (28), interposed between said drive and driven members (16,24) and operable to move between a closed pack mode wherein torque is translated across said clutch pack (30) and an open pack mode wherein torque is interrupted across said clutch pack (30) to connect and disconnect said drive and driven members (16, 24) to selectively transfer and interrupt torque translation therebetween;

a torque apply piston assembly (54) supported in said clutch housing (28), said torque apply piston assembly (54) including a piston (56) that is rotatably supported by said drive member (16) about said common axis of rotation and includes an annular flange (60) extending in the direction of said common axis of rotation, a piston head (62) operable to engage said annular clutch pack (30) and an annular seat (64) formed between said piston head (62) and said axially extending flange (60) and a torque piston biasing member (58) that acts on said seat (64) to bias said piston head (62) toward said clutch pack (30), said torque apply piston assembly (54) operable to move between a disengaged position wherein said clutch pack (30) operates in open pack mode and an engaged position wherein said torque apply piston assembly (54) moves said clutch pack (30) to said closed pack mode to connect and disconnect said drive and driven members (16,24), said torque apply piston assembly (54) operable to provide a constant biasing force so that said clutch pack (30) normally operates in said closed pack mode to translate torque between said drive and driven members (16,24);

a torque interrupt actuator assembly (68) operatively connected to said torque apply piston assembly (54), said torque interrupt actuator assembly (68) operable to selectively move said torque apply piston assembly (54) from said engaged position to said disengaged position thereby interrupting torque translation between said drive and driven members (16,24) through said clutch pack (30); and a return piston assembly (84) supported by said clutch housing (28) and connected to said clutch pack (30), said return piston assembly (84) operable to provide a constant biasing force in a direction opposite to the constant biasing force generated by said torque apply piston assembly (54) to move said clutch pack (30) from said closed pack mode to said open pack mode when said torque interrupt actuator assembly (68) moves said torque apply piston assembly (54) from said engaged position to said disengaged position.

16. An automotive transmission as set forth in claim 15 wherein said torque interrupt actuator assembly (68) includes a throw-out bearing (70) operatively supported for rectilinear movement on said drive member (16) and an actuator (72) that selectively moves said throw-out bearing (70) in a direction opposite to the constant biasing force generated by said torque apply piston assembly (54).

* * * * *